(12) United States Patent
Barton

(10) Patent No.: US 10,511,748 B2
(45) Date of Patent: Dec. 17, 2019

(54) ELECTROSTATIC LENS CLEANING

(71) Applicant: Robert Bosch GmbH, Stuttgart (DE)

(72) Inventor: Matthew Barton, Farmington Hills, MI (US)

(73) Assignee: Robert Bosch GmbH, Stuttgart (DE)

(*) Notice: Subject to any disclaimer, the term of this patent is extended or adjusted under 35 U.S.C. 154(b) by 105 days.

(21) Appl. No.: 15/547,029

(22) PCT Filed: Jan. 25, 2016

(86) PCT No.: PCT/US2016/014738
§ 371 (c)(1),
(2) Date: Jul. 27, 2017

(87) PCT Pub. No.: WO2016/123026
PCT Pub. Date: Aug. 4, 2016

(65) Prior Publication Data
US 2018/0013933 A1    Jan. 11, 2018

Related U.S. Application Data

(60) Provisional application No. 62/109,731, filed on Jan. 30, 2015.

(51) Int. Cl.
*H04N 5/225* (2006.01)
*B08B 6/00* (2006.01)
(Continued)

(52) U.S. Cl.
CPC ............ *H04N 5/2251* (2013.01); *B08B 6/00* (2013.01); *B08B 17/02* (2013.01); *B60S 1/56* (2013.01); *G02B 27/0006* (2013.01)

(58) Field of Classification Search
CPC ........ B08B 6/00; B08B 17/02; H04N 5/2251; B60S 1/56; G02B 27/0006
See application file for complete search history.

(56) References Cited

U.S. PATENT DOCUMENTS 5,012,593 A * 5/1991 Okada ............... B60R 1/0602
                                                      15/250.003
8,172,159 B2   5/2012 Hernandez
(Continued)

FOREIGN PATENT DOCUMENTS

CN   102527672 A   7/2012
CN   103521496 A   1/2014
(Continued)

OTHER PUBLICATIONS

Notice of Reasons for Refusal from the Japanese Patent Office for Application No. 2017-540071 dated Aug. 13, 2018 (6 pages).
(Continued)

*Primary Examiner* — Benjamin L Osterhout
(74) *Attorney, Agent, or Firm* — Michael Best & Friedrich LLP

(57) ABSTRACT

An automotive camera including a camera lens with one or more conductive accumulators and a method of cleaning the camera lens using the conductive accumulators. The automotive camera includes a lens bezel coupled to the camera lens. The lens bezel may be coupled to the conductive accumulators. The conductive accumulators receive electric charge from a power supply of a vehicle and concentrate the electric charge on pointed ends of the conductive accumulators. The charged, pointed ends attract water particles away from the camera lens. The water particles accumulate at the conductive accumulators until gaining sufficient mass. When sufficient mass is gained, the water particles flow across the lens bezel and away from the camera lens.

18 Claims, 7 Drawing Sheets

(51) Int. Cl.
*B60S 1/56* (2006.01)
*G02B 27/00* (2006.01)
*B08B 17/02* (2006.01)

(56) References Cited

U.S. PATENT DOCUMENTS

| | | |
|---|---|---|
| 8,466,430 B2 | 6/2013 | Sando |
| 8,698,095 B2 | 4/2014 | Tanaka et al. |
| 2002/0005440 A1* | 1/2002 | Holt ................. B05B 7/08 239/284.2 |
| 2002/0180880 A1 | 12/2002 | Bean et al. |
| 2003/0155001 A1* | 8/2003 | Hoetzer ............ B60S 1/0822 134/37 |
| 2003/0210906 A1 | 11/2003 | Peterson et al. |
| 2005/0186871 A1 | 8/2005 | Hockaday |
| 2006/0171704 A1* | 8/2006 | Bingle ............... B60R 11/04 396/419 |
| 2007/0256258 A1 | 11/2007 | Takayanagi |
| 2008/0112050 A1 | 5/2008 | Nomura |
| 2009/0190219 A1 | 7/2009 | Teo et al. |
| 2009/0250533 A1* | 10/2009 | Akiyama ............. B60S 1/381 239/284.1 |
| 2010/0174144 A1 | 7/2010 | Hsu et al. |
| 2011/0073142 A1* | 3/2011 | Hattori ............. B60S 1/0848 134/56 R |
| 2012/0243093 A1 | 9/2012 | Tonar et al. |
| 2013/0263393 A1 | 10/2013 | Mazumder |
| 2013/0328672 A1 | 12/2013 | Sesti et al. |
| 2015/0151722 A1* | 6/2015 | Gokan ................. B60S 1/50 134/102.2 |
| 2015/0183406 A1* | 7/2015 | Tanaka ............... B60S 1/56 134/99.1 |
| 2015/0343999 A1* | 12/2015 | Lopez Galera .......... B08B 3/02 134/30 |

FOREIGN PATENT DOCUMENTS

| | | |
|---|---|---|
| DE | 19707223 A1 | 9/1997 |
| JP | H04135602 A | 5/1992 |
| JP | 2005279620 A | 10/2005 |
| JP | 2008148276 A | 6/2008 |
| JP | 2009199025 A | 9/2009 |
| JP | 2009226310 A | 10/2009 |
| JP | 2014019403 A | 2/2014 |

OTHER PUBLICATIONS

International Search Report and Written Opinion for Application No. PCT/US2016/014738 dated Apr. 12, 2016, (13 pages).

* cited by examiner

ELECTROSTATIC LENS CLEANING

BACKGROUND

Modern automotive vision systems rely on various types of automotive vision systems to provide information about the surroundings of the vehicle. These automotive vision systems may include multiple automotive cameras with differing fields of view of the surroundings. In some cases, the multiple automotive cameras provide information to automated vehicle systems, such as lane deviation and warning systems. In other cases, automotive vision systems include a display for viewing images of the surroundings of the vehicle by a driver of the vehicle.

In some configurations, one or more of the multiple automotive cameras are located on the exterior of the vehicle. As a consequence, the automotive cameras may be routinely exposed to inclement weather.

SUMMARY

Rain and snow can degrade the performance of the automotive cameras by obscuring their field of view. For example, water particles (e.g., water droplets) may accumulate on a camera lens and restrict and distort the images produced by the automotive camera. Similarly, snow may accumulate on the camera lens and partially or entirely block the field of view of the automotive camera. These conditions may also degrade the performance of an automated vehicle system that relies on information provided by the automotive cameras. This may result in suboptimal functioning of the automated vehicle system. In addition, the driver of the vehicle may not have a clear view of the surroundings of the vehicle through the automotive vision system. Therefore, it is beneficial to equip vehicles with automotive cameras that can function reliably in various weather conditions.

Water is a polar molecule having a net dipole as a result of opposing charges (i.e. having partial positive and partial negative charges) from polar bonds arranged asymmetrically. Because of this, when water particles are exposed to a surface with an electrostatic potential, like charges in the water particles repel from like charges on the surface. When the like charges are repelled, the water droplet is orientated with opposing charge facing the surface. Since opposing charges attract, the surface then attracts the water droplet.

Since weather conditions may deposit water particles on a camera lens, an automotive camera that is configured to automatically remove the water particles may be advantageous over an automotive camera that is not so equipped. Accordingly, embodiments of the invention provide a system and a method of cleaning the camera lens using electrostatic forces. In particular, a conductive accumulator is located near to the camera lens such that water particles on the camera lens are attracted to the conductive accumulator and away from the camera lens.

In one embodiment, an automotive camera with automatic lens cleaning is provided. The automotive camera includes a camera housing, a lens bezel coupled to the camera housing, and a camera lens having an interior surface and an exterior surface. The camera lens is coupled to the lens bezel. The automotive camera also includes a conductive path and a conductive accumulator having a pointed end and a base electrically connected to the conductive path. The conductive accumulator is configured to receive an electric charge from the conductive path. When the electric charge is received, the conductive accumulator concentrates the electric charge at the pointed end. As a consequence, water particles on the camera lens are attracted to the conductive accumulator based on an amount of the electric charge concentrated at the pointed end.

In another embodiment, a method of cleaning an automotive camera lens is provided. The method includes providing a conductive accumulator having a base and a pointed end and positioning the conductive accumulator juxtaposed and spaced apart from an exterior surface of a camera lens. The method also includes electrically connecting the conductive accumulator to a conductive path, electrically connecting the conductive path to a power supply, and supplying the conductive accumulator with an electric charge.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

It should be noted that a plurality of hardware and software based devices, as well as a plurality of different structural components may be used to implement the invention. In addition, it should be understood that embodiments of the invention may include hardware, software, and electronic components or modules that, for purposes of discussion, may be illustrated and described as if certain components were implemented solely in hardware. However, one of ordinary skill in the art, based on a reading of this detailed description, would recognize that, in at least one embodiment, aspects of the invention may be implemented in software (e.g., stored on non-transitory computer-readable medium) executable by one or more processors. Accordingly, it should be noted that a plurality of hardware and software based devices, as well as a plurality of different structural components may be utilized to implement various embodiments. For example, "control units" and "controllers" described in the specification can include one or more electronic processors, one or more memory modules including non-transitory computer-readable medium, one or more input/output interfaces, and various connections (e.g., a system bus, conductive tracks, wires, and the like) connecting the components.

Figure 1:
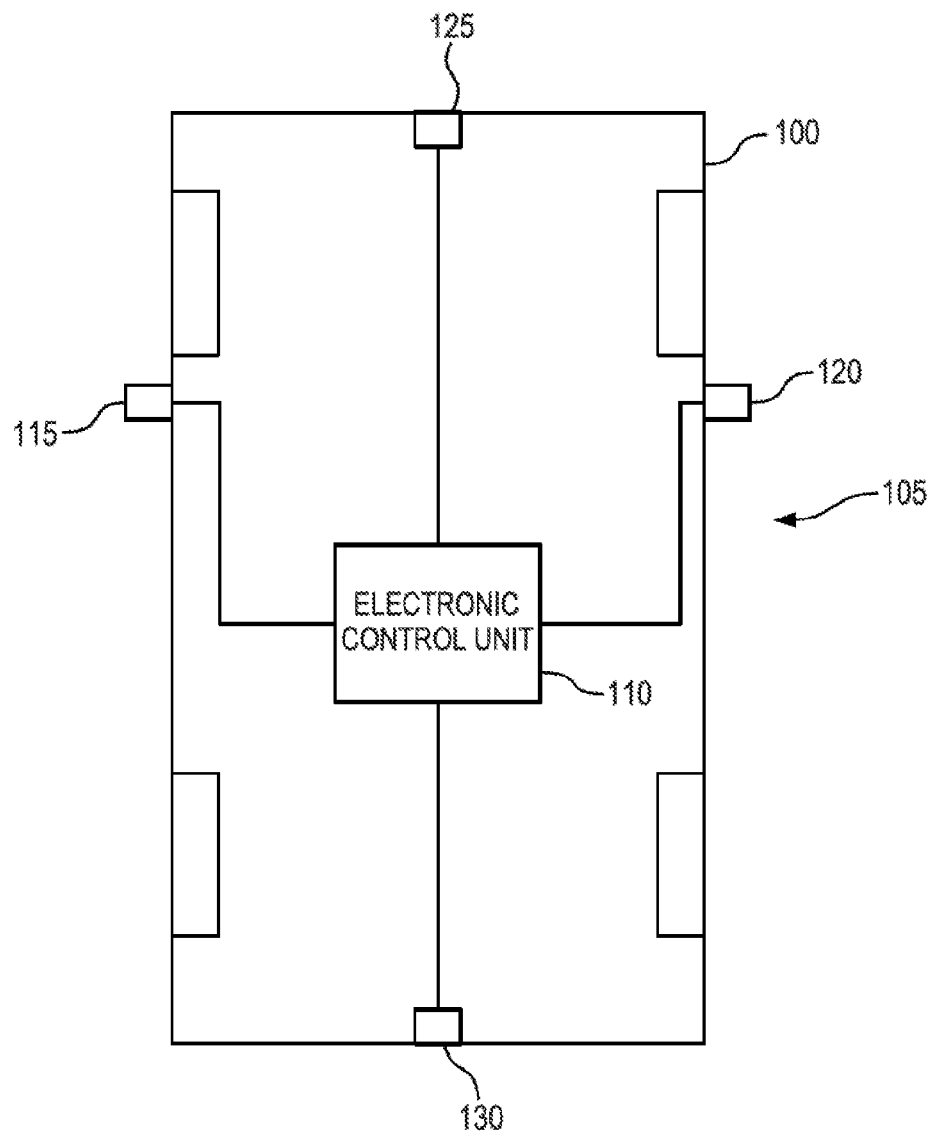
FIG. 1 is a block diagram of a vehicle equipped with an automotive camera system including automotive cameras with automatic lens cleaning.

FIG. 1 illustrates a vehicle 100 equipped with an automotive camera system 105. In the example illustrated, the automotive camera system 105 includes an electronic control unit (ECU) 110, a driver-side camera 115, a passenger-side camera 120, a front camera 125, and a rear camera 130. As illustrated, the automotive camera system 105 may include four automotive cameras. However, in other embodiments, the automotive camera system 105 may include one, two, three, or more automotive cameras. Similarly, the automotive camera system 105 may include one electronic control unit that controls and coordinates all of the automotive cameras or may include multiple electronic control units that each control a particular automotive camera. When each particular automotive camera is controlled by an electronic control unit 110, the electronic control unit 110 may be included within the particular automotive camera. In this case, the electronic control unit 110 handles operation and control of the particular automotive camera.

Figure 2:
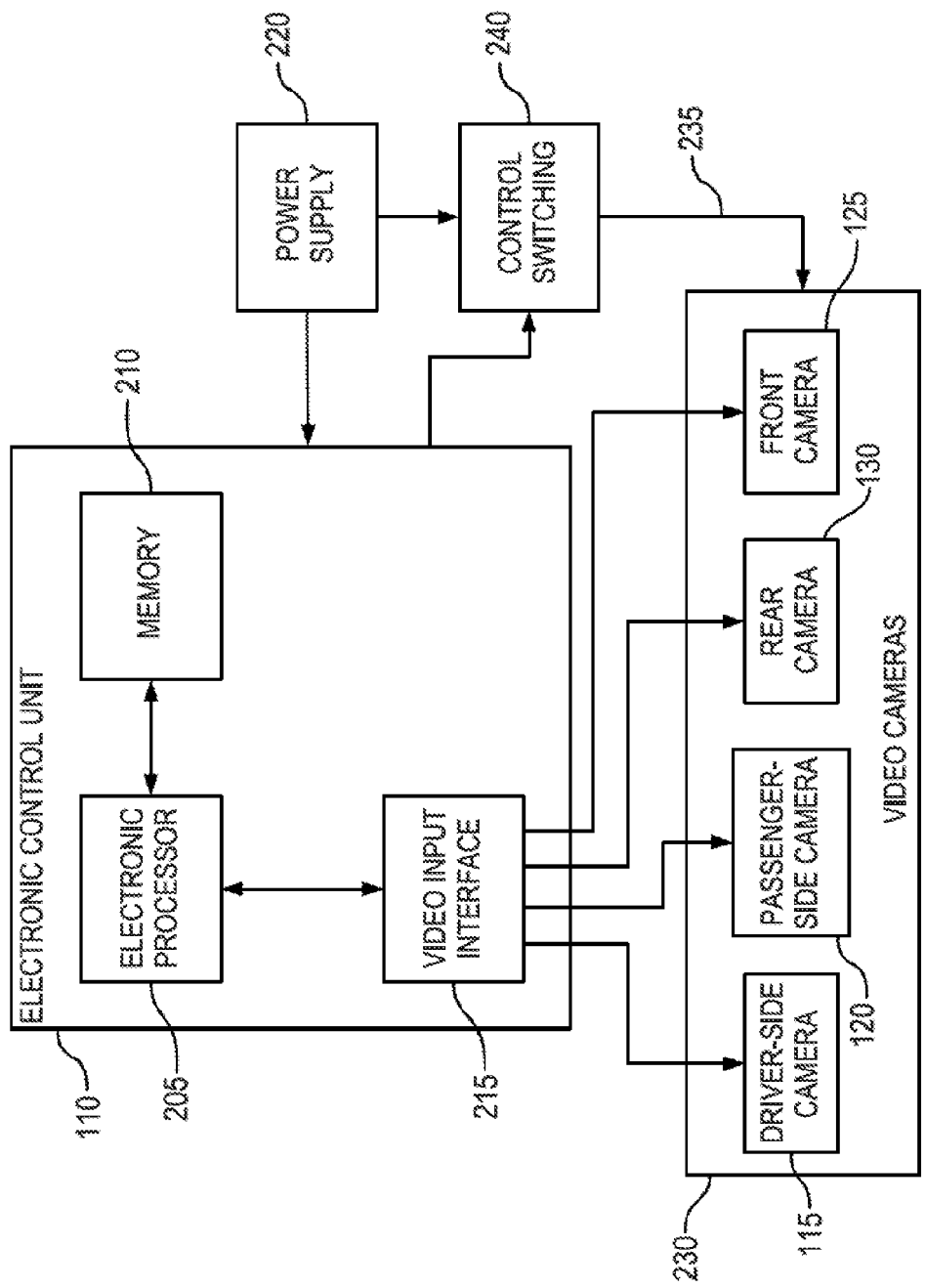
FIG. 2 is a block diagram of the automotive camera system of FIG. 1.

An embodiment of the automotive camera system 105 is illustrated in FIG. 2. The electronic control unit 110 includes a plurality of electrical and electronic components that provide power, operation control, and protection to the components and modules within the electronic control unit 110. The electronic control unit 110 includes, among other things, an electronic processor 205 (such as a programmable electronic microprocessor, microcontroller, or similar device), a memory 210 (e.g., non-transitory, machine readable memory), and a video input interface 215. The electronic processor 205 is communicatively coupled to the memory 210 and executes instructions which are capable of being stored on the memory 210. The electronic processor 205 is configured to retrieve from memory 210 and execute, among other things, instructions related to the control or implement processes and methods described herein. In other embodiments, the electronic control unit 110 includes additional, fewer, or different components. The electronic control unit 110 may be implemented in several independent electronic control units each configured to perform specific functions or sub-functions. Additionally, the electronic control unit 110 may contain sub-modules that input and process images (e.g., video streams) and perform related processes.

The driver-side camera 115, the passenger-side camera 120, the front camera 125, and the rear camera 130 are collectively illustrated and described as video cameras 230. The electronic control unit 110 may be electrically and communicatively coupled to the video cameras 230 or to a single one of the video cameras 230. The electronic control unit 110 is also electrically coupled to a power supply 220 that provides power to the electronic control unit 110. The power supply 220 may include a battery of the vehicle 100 or other power storage or generating device. In some embodiments, the electronic control unit 110 provides an electrical pathway to supply power from the power supply 220 to the video cameras 230.

In some embodiments, the power supply 220 is electrically coupled to the video cameras 230 via a conductive path 235 (e.g., a power supply line). The conductive path 235 is electrically coupled to and extends through control switching 240 that may turn on and off power to the video cameras 230. In such embodiments, the electronic control unit 110 is communicatively coupled to the control switching 240. The electronic control unit 110 may actuate and control the power supplied to the video cameras 230 via the control switching 240. The control switching 240 may be located within each of the video cameras 230 or may be external to the video cameras 230 as illustrated. In some embodiments, the control switching 240 may be located inside the electronic control unit 110. The power supplied to the video cameras 230 may also be controlled by the electronic control unit 110 to charge conductive accumulators as described below.

Figure 3:
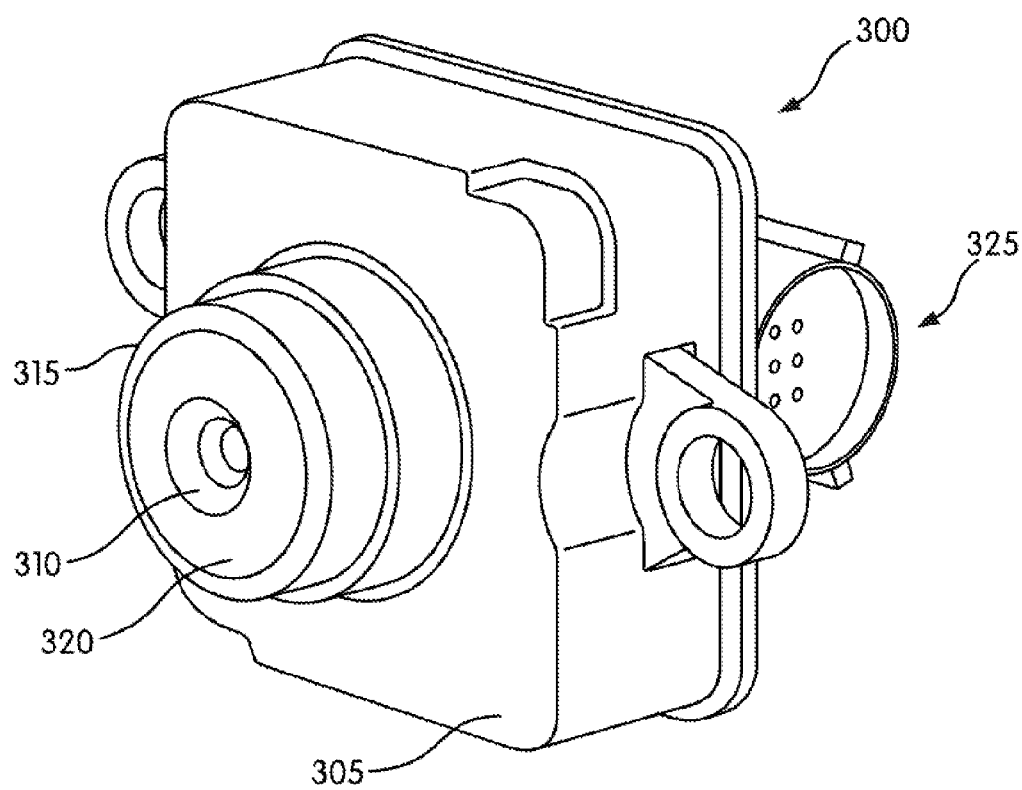
FIG. 3 is a perspective view of an automotive camera of the automotive camera system of FIG. 1.

FIG. 3 illustrates an automotive camera 300 according to one embodiment. The automotive camera 300 may be of various types and designs. For example, the automotive camera 300 may be configured to mount on an interior of a windshield, on a side mirror, on a rear door, underneath the vehicle 100, and the like. The automotive camera 300 may be used as one or more of the driver-side camera 115, the passenger-side camera 120, the front camera 125, and the rear camera 130. The automotive camera 300 includes a camera housing 305, a camera lens 310, and a lens bezel 315. The automotive camera 300 also includes an electrical socket 325 (e.g., an electrical connector) configured to electrically connect the automotive camera 300 to an electrical system of the vehicle 100. For example, the electrical socket 325 may be electrically coupled to the conductive path 235, which is electrically coupled to the power supply 220. The electrical socket 325 may be built into the camera housing 305 or located external to the camera housing 305. For example, the electrical socket 325 may include an external electrical connector or a wiring harness. In some embodiments, the electrical socket 325 is directly or indirectly coupled to the video input interface 215.

Figure 4:
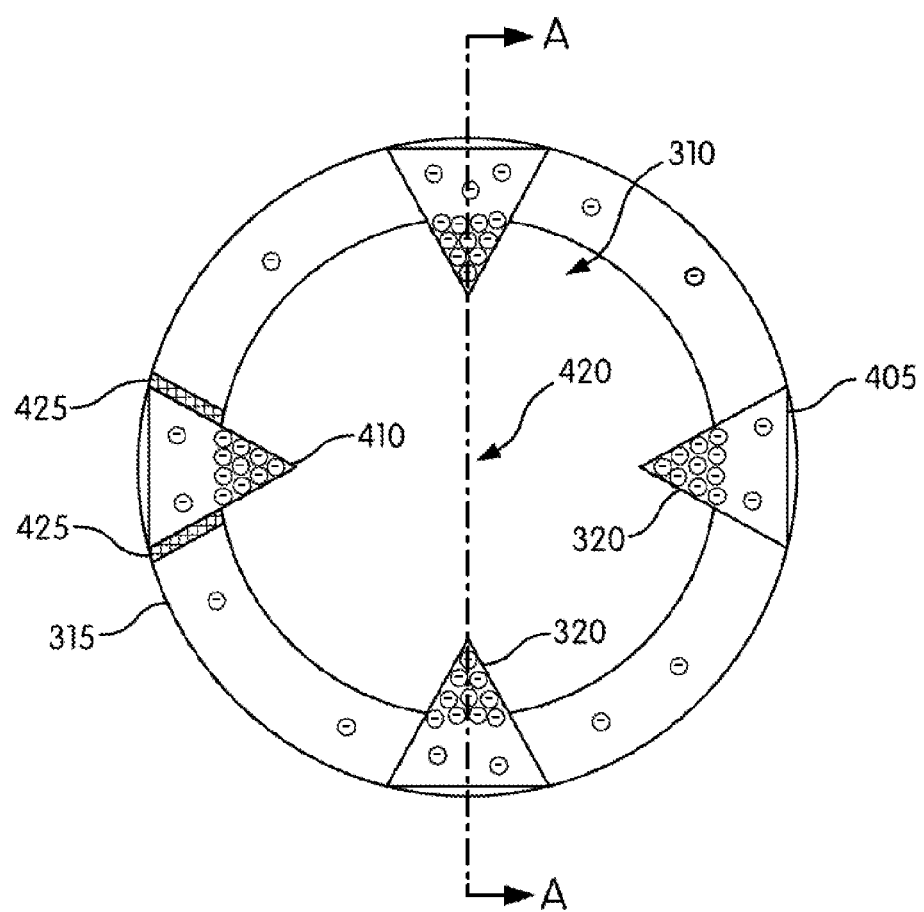
FIG. 4 is a top-view of a lens bezel with four conductive accumulators of the automotive camera of FIG. 3.

As illustrated in FIG. 4, the automotive camera 300 may include one or more conductive accumulators (e.g., pointed attractors) 320 positioned over the lens bezel 315. In the illustrated embodiment, the automotive camera 300 includes four conductive accumulators 320 that protrude inward from the lens bezel 315 and outward from an outer surface of the camera lens 310. In some embodiments, the conductive accumulators 320 are affixed to and electrically connected to the lens bezel 315. However, in some other embodiments, the conductive accumulators 320 may be affixed to and electrically connected at places other than the lens bezel 315. For example, the conductive accumulators 320 may be coupled directly or indirectly to the camera housing 305.

In the illustrative example, the conductive accumulators 320 are mechanically and electrically coupled to the lens bezel 315. The conductive accumulators 320 may be affixed to the lens bezel 315 in various styles of connections. For example, the connection may be formed from a bolted, riveted, welded, crimped, fused, or other mechanical fastening technique. In other embodiments, the conductive accumulators 320 may be formed with the lens bezel 315 as a single monolithic piece. In some embodiments, channels 425 are cut in the lens bezel 315. The channels 425 may be radially-orientated grooves positioned through the lens bezel 315. The channels 425 are configured to direct a flow of water particles away from the camera lens 310 using surface tension.

Although illustrated with four conductive accumulators 320, the automotive camera 300 may have any number of the conductive accumulators 320. For example, the automotive camera 300 may have one, two, three, or more conductive accumulators 320. The conductive accumulators 320 may take a variety of shapes and be orientated in different configurations. For example, the conductive accumulators 320 may be positioned around the circumference of the lens bezel 315 as illustrated. In some embodiments, the conductive accumulators 320 have a base 405 and a pointed end 410 (e.g., a pointed tip). In these embodiments, the base 405 is coupled to the lens bezel 315 and the pointed end 410 radially extends toward a center 420 of the camera lens 310. As a consequence, the conductive accumulators 320 are effectively orientated approximately radially-inward toward the center 420 of the camera lens 310.

Figure 5:
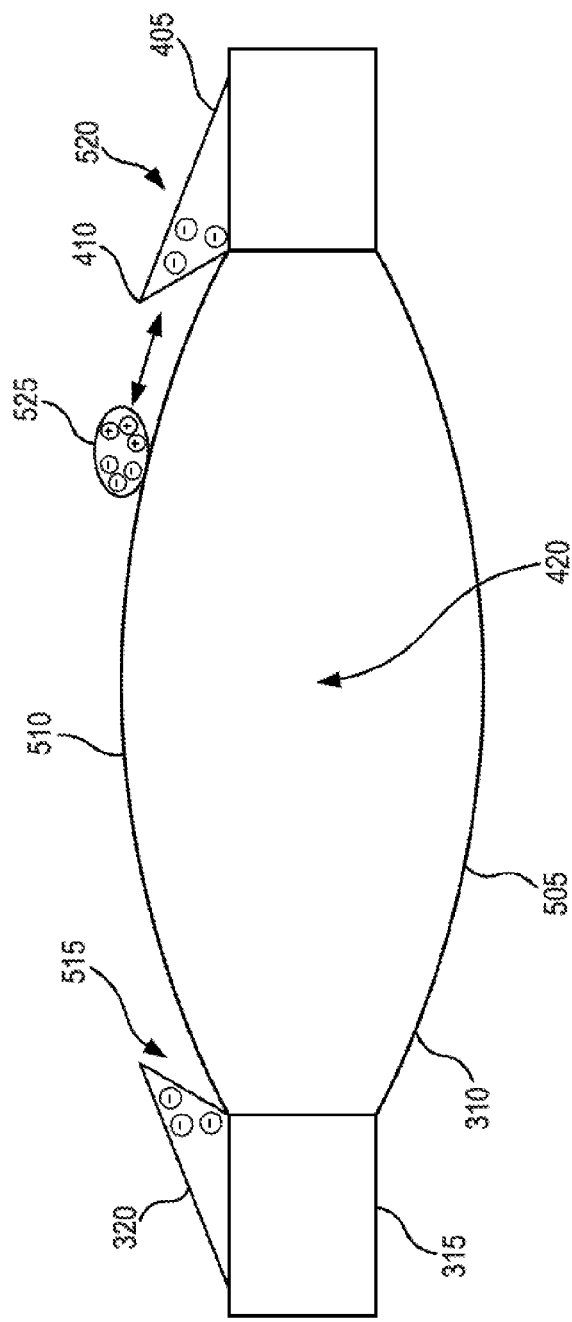
FIG. 5 is a cross-sectional view of the lens bezel, the camera lens, and the conductive accumulators of the automotive camera of FIG. 3 according to one embodiment.

FIG. 5 illustrates a cross-sectional view along the line A-A of the lens bezel 315 and the camera lens 310 of FIG. 4. The camera lens 310 includes an interior surface 505 and an exterior surface 510. The interior surface 505 of the camera lens 310 faces the camera housing 305 and optical components (not illustrated) of the automotive camera 300. The exterior surface 510 faces away from the camera housing 305 and the optical components of the automotive camera 300.

As illustrated in the embodiment of FIG. 5, the pointed end 410 is positioned apart (i.e., spaced apart) from the exterior surface 510 of the camera lens 310. As a consequence, a gap 515 is formed between the pointed end 410 and the exterior surface 510 of the camera lens 310. The conductive accumulators 320 may be orientated approximately parallel to the camera lens 310 or, as in the illustrative embodiment, may be angled away from the exterior surface 510 of the camera lens 310. In such an embodiment, the gap 515 increases in size towards the center 420 of the camera lens 310. In other constructions, the conductive accumulators 320 may be physically touching the camera lens 310. In these constructions, the conductive accumulators 320 may be electrically insulated from the camera lens 310 with an insulator positioned between the conductive accumulators and the camera lens 310.

Figure 6:
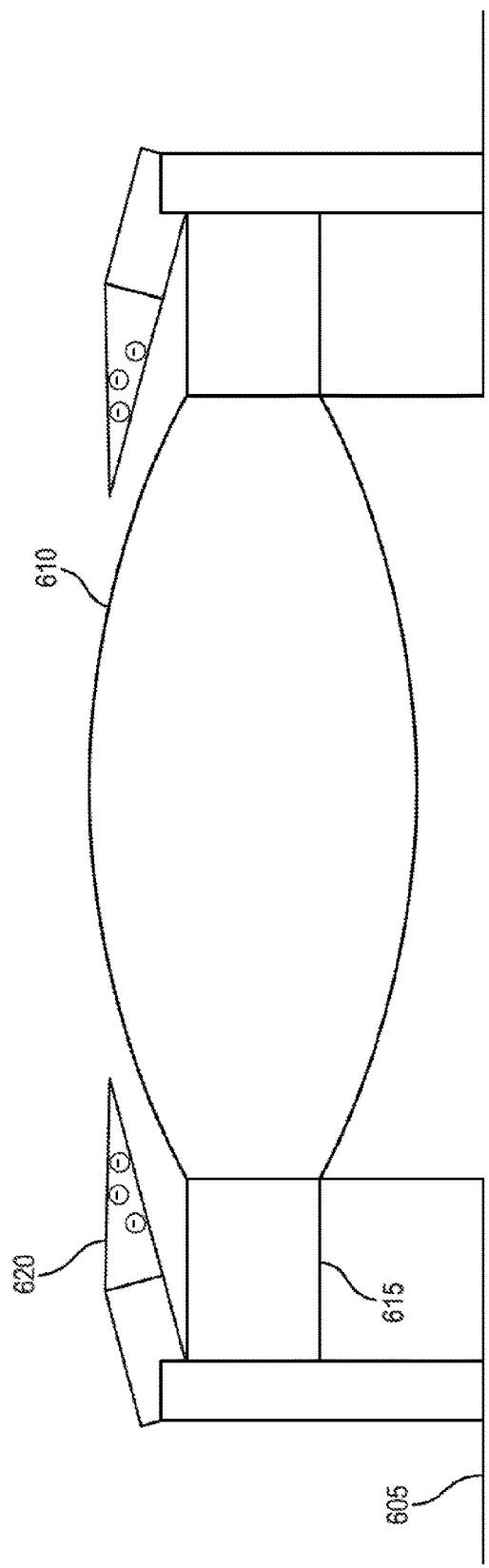
FIG. 6 is a cross-sectional view of the lens bezel, the camera lens, and the conductive accumulators of the automotive camera of FIG. 3 according to another embodiment.

FIG. 6 illustrates a cross-sectional view of a camera housing 605, a camera lens 610, a lens bezel 615, and one or more conductive accumulators 620 according to another embodiment. As illustrated, the conductive accumulators 620 may be coupled to locations other than the lens bezel 615. For example, the conductive accumulators 620 may be directly or indirectly coupled to the camera housing 605. In these embodiments, the conductive accumulators 620 may be positioned and orientated similarly as described above. However, the conductive accumulators 620 may be supported by the camera housing 605, rather than the lens bezel 615. In these embodiments, the conductive accumulators 620 may be adjacent to and physically touching the lens bezel 615 without being mechanically coupled to the lens bezel 615. In other embodiments, the conductive accumulators 620 may be mechanically coupled to both the lens bezel 315 and the camera housing 605.

The conductive accumulators 620 may be electrically coupled in various types of configurations. For example, in some embodiments, the conductive accumulators 320 may be electrically coupled to the lens bezel 315. In these embodiments, electric charge that flows to the lens bezel 615 naturally flows to the conductive accumulators 620. In this way, the lens bezel 615 is configured to receive the electric charge from the conductive path 235 and transfer the electric charge to the conductive accumulators 320. In other configurations, the conductive accumulators 620 may be electrically coupled via a wired connection to the electrical socket 325. In particular, the electrical socket 325 provides power to charge the conductive accumulators 620. In this embodiment, the conductive accumulators 620 may be electrically isolated from the lens bezel 615.

In the embodiments described, the conductive accumulators 320 are directly or indirectly electrically connected to the power supply 220 of the vehicle 100. The conductive accumulators 320 may electrically connect to the conductive path 235 via the camera housing 305. For example, the conductive path 235 may include one or more wires or electrical traces that couple to a power terminal of the electrical socket 325 of the automotive camera 300. The conductive path 235 thereby provides electric charge (e.g., creates an electrostatic potential) to the conductive accumulators 320. One or more electrical switches (e.g., transistors or mechanical switches), fuses, or both may be included in the control switching 240, which is positioned between the power supply 220 and the conductive accumulators 320. The control switching 320 controls energization of the conductive accumulators 320 based on commands from the electronic control unit 110. For example, on startup of the vehicle 100, the conductive accumulators 320 may be energized via a transistor actuated by the electronic control unit 110. The electronic control unit 110 may energize the conductive accumulators 320 based on timing sequences, weather conditions, and the like. In other embodiments, the conductive accumulators 320 may be energized by a mechanical switch independent of the electronic control unit 110, such as, for example, an ignition switch.

Once energized, the conductive accumulators 320 receive electric charge from the power supply 220. In some embodiments, the conductive accumulators 320 receive the electric charge via the lens bezel 315. The conductive accumulators 320 have greater surface curvature (e.g., surface angles) than the lens bezel 315. Generally, on a charged surface, electrostatic potential is greatest where the curvature of the charged surface is greatest. Since the conductive accumulators 320 have a greater amount of surface curvature compared to other locations that receive the electric charge, the electric charge flows to and accumulates on the conductive accumulators 320. In particular, the pointed end 410 of the conductive accumulators 320 is the point of greatest surface curvature. As a consequence, the conductive accumulators 320 concentrate and focus the electrostatic potential at the pointed end 410.

As illustrated in FIG. 5, the pointed end 410 is located near to the lens bezel 315 and located just above the exterior surface 510 of the camera lens 310. Once electric charge 520 is concentrated at the pointed end 410, an attractive force is created between the pointed end 410 and a water particle 525 on the camera lens 310. The electric charge 520 on the conductive accumulators 320 induces an opposite charge on a surface of a water particle 525 facing the conductive accumulators 320. The opposite charges from the conductive accumulators 320 and the surface of the water particle 525 facing the conductive accumulators 320 attract, and once the attractive force between the pointed end 410 and the water particle 525 is large enough, the water particle 525 traverses the exterior surface 510 of the camera lens 310 and travels toward the pointed end 410. As more electric charge 520 accumulates at the pointed end 410, the attractive force increases. As a consequence, the water particle 525 is attracted to the pointed end 410 based on an amount of electric charge 520 concentrated at the pointed end 410. As such, the attractive force pulls the water particle 525 away from the center 420 of the camera lens 310 and toward the conductive accumulators 320.

As water particles gather at the conductive accumulators 320, they clump together and become large, heavy droplets. Once these water particles have sufficient mass, the electrostatic force between the conductive accumulators and the water particles is insufficient to hold them to the conductive accumulators 320. Once large enough, the water particles break free from the electrostatic force due to the presence of other forces acting on the water particles. For example, gravity, wind shear, vibration, acceleration due to motion of the vehicle 100, and the like act on the water particles. When these forces overcome the attractive force of the conductive accumulators 320, the water particles pull away from the conductive accumulators 320. Due to the nature of these forces, the water particles break free and flow around the lens bezel 315 and away from the camera lens 310. In some embodiments, the water particles may be directed by the channels 425 to flow over or through the lens bezel 315 and away from the camera lens 310.

Figure 7:
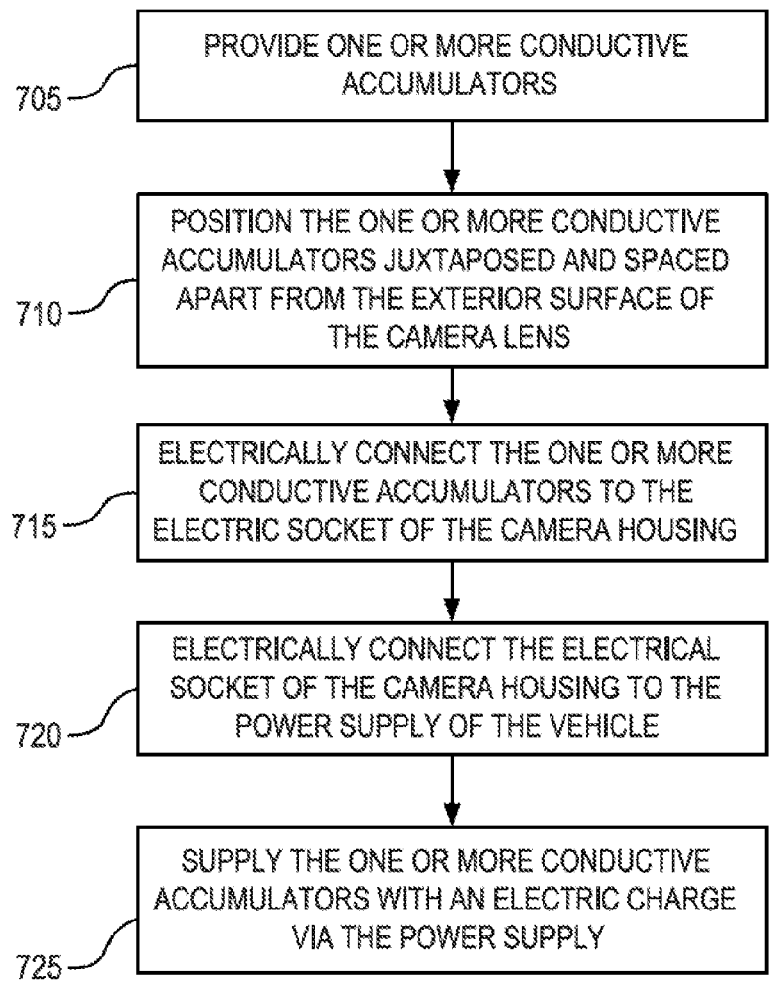
FIG. 7 is a flowchart of a method of cleaning a camera lens of the automotive camera of FIG. 3.

FIG. 7 illustrates a method of cleaning the camera lens 310 using the conductive accumulators 320. The method of cleaning the camera lens 310 is as follows. Provide one or more conductive accumulators 320 to the automotive camera 300 (block 705). Position the conductive accumulators 320 juxtaposed and spaced apart from the exterior surface 510 of the camera lens 310 (block 710). Electrically connect the conductive accumulators 320 to the electrical socket 325 of the camera housing 305 (block 715). Electrically connect the electrical socket 325 of the camera housing 305 to the power supply 220 of the vehicle 100 (block 720). Supply the conductive accumulators 320 with electric charge via the power supply 220 (block 725). In some embodiments, this may be done by charging the lens bezel 315 with the electric charge from the conductive path 235 and routing the electric charge to the conductive accumulators 320.

The electronic control unit 110 may supply a direct current (DC) voltage to the conductive accumulators 320 to provide the electric charge. Further, the electronic control unit 110 may electrically connect the conductive accumulators 320 to the power supply 220 via switches actuated by the electronic control unit 110 based on factors including temperature, weather, running condition of the vehicle 100, length of time of operation of the vehicle 100, and the like. Due to the shape of the conductive accumulators 320, the electric charge 520 is concentrated at the pointed end 410 of the conductive accumulators 320. As discussed above, the concentrated electric charge 520 attracts water particles to the pointed end 410 and diverts the water particles away from the camera lens 310.

In some embodiments, the conductive accumulators 320 may be covered by electrically-insulating material or by an electrically-insulating coating. For example, the conductive accumulators 320 may be coated with a nonconductive coating of rubber or plastic film. The coating may completely cover all of exposed areas or only portions of the conductive accumulators 320. The coating protects the conductive accumulators 320 from damage and may also electrically insulate the conductive accumulators from external objects. The coating may also cover the lens bezel 315 or portions thereof.

In some embodiments, an alternating current (AC) or direct current (DC) may be supplied to the lens bezel 315 and the conductive accumulators 320. The current may induce an electric charge on the conductive accumulators 320 such that they function as described above. In addition, the current generates heat, which warms the lens bezel 315 and the camera lens 310. In some embodiments, heating elements may be positioned within or coupled to the lens bezel 315. In these embodiments, the current flows through the heating elements to produce heat and thereby increase the temperature of the lens bezel 315 and the camera lens 310. In other embodiments, the material of the lens bezel 315 may be semi-resistive and generate heat when the current flows through the lens bezel 315. Heat generated allows the lens bezel 315 to function as a lens defroster. For example, the lens bezel 315 may warm the camera lens 310 and melt any snow, ice or frost accumulated on the camera lens 310. Once melted, remaining water particles are attracted to the conductive accumulators 320 and away from the camera lens 310 as previously described.

Thus embodiments provide, among other things, a system and a method of cleaning a camera lens of an automotive camera with one or more conductive accumulators positioned near to the camera lens. The conductive accumulators may be coupled to and receive electric charge from a lens bezel of the automotive camera.

The invention claimed is:

1. An automotive camera with automatic lens cleaning, the automotive camera comprising:
   a camera housing;
   a lens bezel coupled to the camera housing;
   a camera lens having an interior surface and an exterior surface, the camera lens coupled to the lens bezel;
   a conductive path; and
   a conductive accumulator having a pointed end and a base electrically connected to the conductive path, the conductive accumulator configured to
   receive an electric charge from the conductive path,
   concentrate the electric charge at the pointed end, and
   attract water particles to the pointed end based on an amount of the electric charge concentrated at the pointed end.

2. The automotive camera with automatic lens cleaning of claim 1, wherein the camera housing includes an electrical connector configured to electrically couple to a power supply line that is electrically coupled to a power supply of a vehicle.

3. The automotive camera with automatic lens cleaning of claim 1, where the lens bezel includes channels to divert the water particles away from the camera lens.

4. The automotive camera with automatic lens cleaning of claim 3, wherein the channels are radially-orientated grooves positioned through the lens bezel.

5. The automotive camera with automatic lens cleaning of claim 1, wherein the lens bezel is configured to receive the electric charge from the conductive path and transfer the electric charge to the conductive accumulator.

6. The automotive camera with automatic lens cleaning of claim 5, wherein the lens bezel includes heating elements that increase in temperature when the lens bezel receives the electric charge.

7. The automotive camera with automatic lens cleaning of claim 5, wherein the conductive path is electrically coupled to an electrical socket coupled to the camera housing.

8. The automotive camera with automatic lens cleaning of claim 5, wherein the conductive accumulator is spaced apart and juxtaposed from the exterior surface of the camera lens with a gap between the conductive accumulator and the exterior surface of the camera lens.

9. The automotive camera with automatic lens cleaning of claim 1, wherein the pointed end of the conductive accumulator is pointed approximately radially-inward toward a center of the camera lens.

10. The automotive camera with automatic lens cleaning of claim 1, wherein the conductive accumulator includes a nonconductive coating covering a surface of the conductive accumulator.

11. The automotive camera with automatic lens cleaning of claim 10, wherein the conductive accumulator is adjacent to the exterior surface and wherein the nonconductive coating electrically insulates the conductive accumulator from the camera lens.

12. A method of cleaning an automotive camera lens, the method comprising:
   providing a conductive accumulator having a base and a pointed end;

positioning the conductive accumulator juxtaposed and spaced apart from an exterior surface of a camera lens;

electrically connecting the conductive accumulator to a conductive path;

electrically connecting the conductive path to a power supply; and supplying the conductive accumulator with an electric charge.

13. The method of cleaning an automotive camera lens of claim 12, the method comprising:

electrically coupling an electrical connector to a power supply line that is electrically coupled to a power supply of a vehicle.

14. The method of cleaning an automotive camera lens of claim 12, the method comprising:

diverting water particles away from the camera lens using channels in a lens bezel.

15. The method of cleaning an automotive camera lens of claim 12, the method comprising:

charging a lens bezel with the electric charge from the conductive path; and routing the electric charge to the conductive accumulator.

16. The method of cleaning an automotive camera lens of claim 12, the method comprising:

heating a lens bezel with the electric charge.

17. The method of cleaning an automotive camera lens of claim 12, the method comprising:

spacing the conductive accumulator apart from the exterior surface of the camera lens with a gap between the conductive accumulator and the exterior surface of the camera lens; and orientating the conductive accumulator approximately radially-inward toward a center of the camera lens.

18. The method of cleaning an automotive camera lens of claim 12, the method comprising:

coating a surface of the conductive accumulator with a nonconductive coating, and wherein supplying the conductive accumulator with an electric charge includes supplying the conductive accumulator with the electric charge via control switching electrically coupled to the conductive path.

* * * * *